March 31, 1942.　　H. KLAUCKE　　2,277,915
TWIST CHAIN
Filed Aug. 28, 1940　　2 Sheets-Sheet 1

Hermann Klaucke
INVENTOR.

BY George A Evans
ATTORNEY.

March 31, 1942.                H. KLAUCKE                    2,277,915
                                TWIST CHAIN
                           Filed Aug. 28, 1940              2 Sheets-Sheet 2

Hermann Klaucke
INVENTOR.

BY George A. Evans
ATTORNEY.

Patented Mar. 31, 1942

2,277,915

UNITED STATES PATENT OFFICE 2,277,915

TWIST CHAIN

Hermann Klaucke, Worcester, Mass., assignor to Chain Belt Company, Milwaukee, Wis., a corporation of Wisconsin Application August 28, 1940, Serial No. 354,571

4 Claims. (Cl. 74—246)

This invention relates to sprocket chain of the type which is used for transmitting power between shafts. The chain of this invention is primarily designed for truck and tractor service where the axles on which the wheels are mounted assume extreme angles with the drive or jack shaft when the vehicle is passing over rough ground. In such transmissions, the driving and driven sprockets are almost constantly out of alignment, the orientation being first on one side and then the other depending upon the slope and irregularities of the road surface. Sprockets mounted on such shafts are oriented from their normal planes into non-parallel planes resulting in twisting of the chain transmission.

The conventional type of chain is entirely too rigid for this service, and causes excessive wear on the sprocket teeth, which in turn destroys proper sprocket action and tends to produce premature chain failure. To provide a suitable chain for this type of service is the principal object of the present invention.

While I am aware that various means have been disclosed in the past which to a certain extent would accommodate the misalignment occurring in such service as has been described, still there are many practical objections to the utilization of such chains. In fact, experience has demonstrated that a conventional, non-twisting chain gives better service than such expedients as have heretofore been proposed.

The present invention is predicated on the concepts that during normal transmission conditions, i. e. when the shafts are aligned, the action should be as nearly like the conventional chain as possible, yet when the shafts become misaligned, transition to a twisting condition shall be smooth and continuous. Subsequently while running in an oriented position, conventional chain action should be maintained as under the original conditions. In general, chain twisting should take place while straight-line chain contact between pin and bushing of adjacent links is at all times maintained throughout the length of the bearing formed by the chain pins and bushings. Since shaft orientations may be sudden and severe, the action is simultaneous and the members of the chain must be capable of withstanding the extreme shocks imposed.

It is an object of the present invention to provide a chain which will be simple and inexpensive to manufacture, which will accommodate the type of twisting heretofore described and which will give long and satisfactory service.

These and other objects are attained by means described herein, and disclosed in the accompanying drawings, in which like numbers are used to describe like parts throughout. In the drawings.

Figure 1:
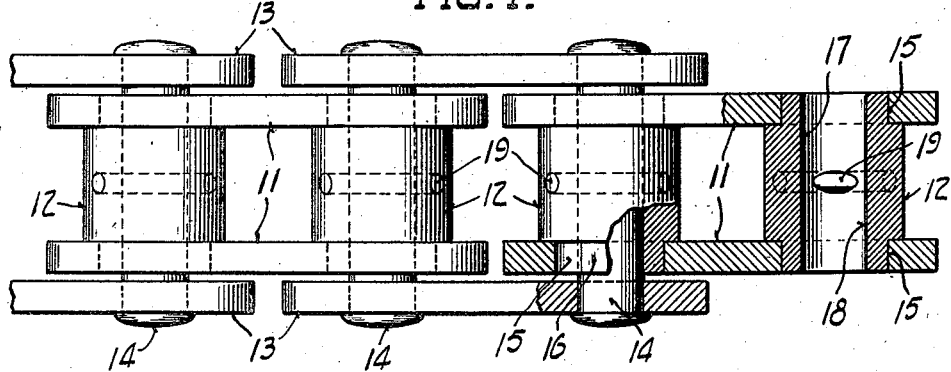
Figure 1 is a plan view, taken partly in section, of a chain strand.

In the drawings, the chain illustrated is of the type embodying straight side plates, the inside links comprising parallel plates 11, the ends of which are connected by bushings 12, while the outside links comprise parallel side plates 13, the ends of which are connected by pins 14, the latter being arranged to extend through the bushings when the links are assembled. The bushings illustrated are provided with outer, shouldered portions 15 at the extremities and are keyed as at 16 to prevent rotation with respect to the side plates 11 containing them. Pins 14 may be of constant diameter throughout and are press-fitted or otherwise rigidly secured to the ends of the outer or pin, side plates 13.

Figure 2:
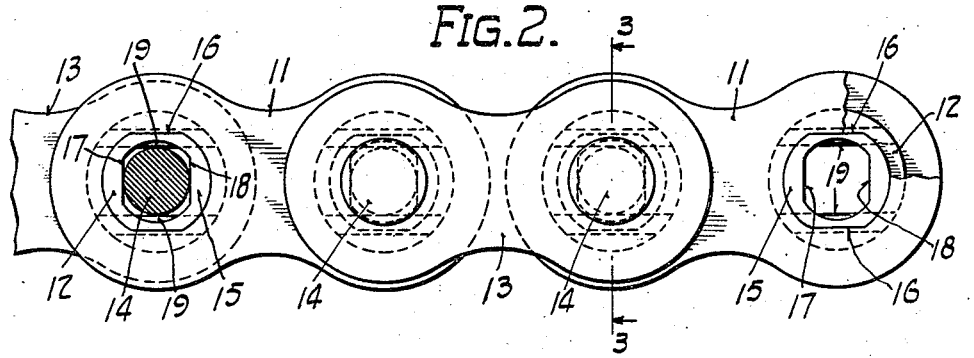
Figure 2 is a side elevational view, also partly in section, of the structure shown in Figure 1.
Figure 3:
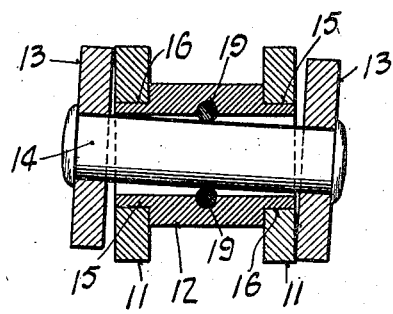
Figure 3 is a transverse cross section taken on the line 3—3 of Figure 2, showing the links relatively tilted.
Figure 4:
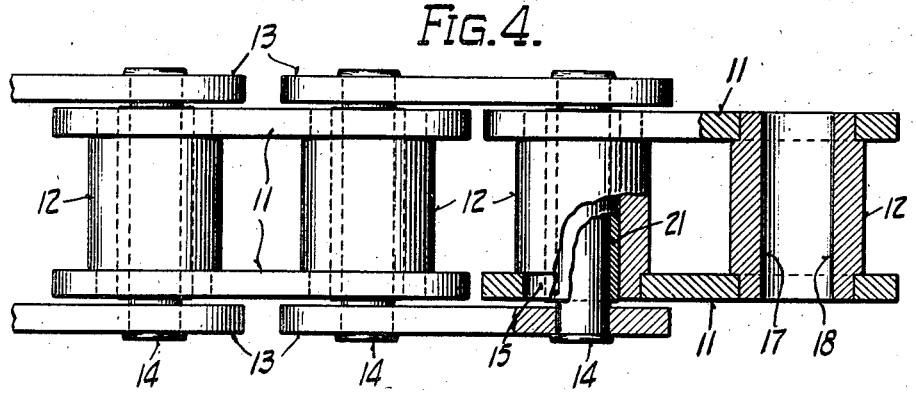
Figure 4 is a plan view, taken partly in section, showing a modified form of chain embodying the present invention.
Figure 5:
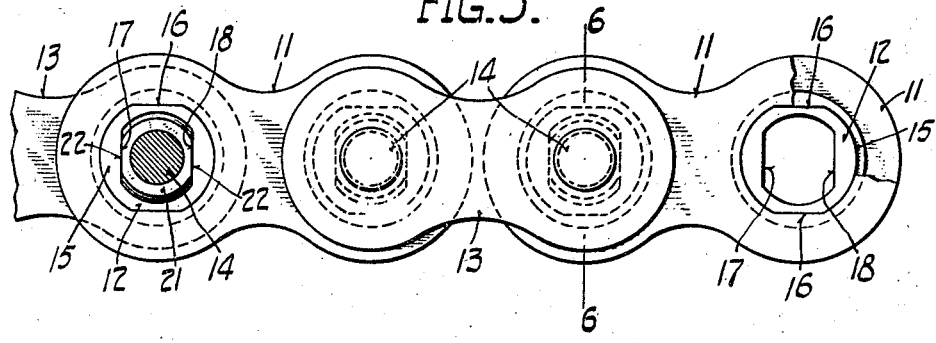
Figure 5 is a side elevation, partly in section of the structure shown in Figure 4.
Figure 6:
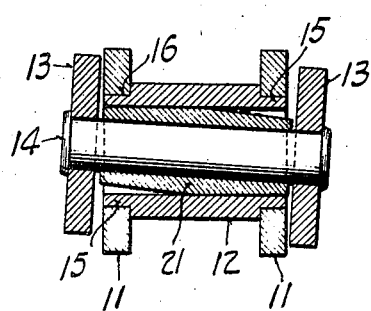
Figure 6 is a cross section taken on the line 6—6 of Figure 5.

In the form of the invention shown in Figures 1-3 inclusive, the bore in the bushing is generally oblong in cross section with straight, flat, parallel sides 17 and 18 in planes normal to chain links or the direction of the chain movement during straight pulls. The diameter of the bushing bore in the plane of the links or the distance between these flat sides is just enough to accommodate a pin 14 in bearing contact at all times with the internal flat sides of the bushing.

The diameter of the bushing bore in a plane transverse to the links is slightly greater than the pin diameter in order that the pin may tilt relative to the bushing to accommodate the chain to such misalignment of the sprockets of a transmission as may occur. As illustrated herein this portion of the bushing bore is circular in cross section, the flat sides 17 and 18 being arranged as chords thereof.

Intermediate the ends of the bushing and preferably at the center thereof are a pair of pilot pins 19 one arranged above and one below the chain pin 14, as clearly illustrated in Figure 3. The axes of these pins are parallel to the chain links and at right angles to the chain pin, the major portion of each pilot pin 19 being contained in the bushing, but a sufficient part extending into the interior of the bore to afford a bearing contact with the chain pin. Consequently, movement of pin 14 within the bushing is limited to rocking about the pilot pins 19 which serve in effect as fulcrums therefor.

By disposing each pilot pin 19 an equal distance from the pitch line of the chain or the center of the chain bushing, rocking of the chain pin on the bearing surface thus provided is balanced in each direction. The amount of such pin rocking is only a few degrees on either side of the bushing axis and it is always in a plane normal to the chain links. The width of the flat sections 17 and 18 under such conditions is sufficient to maintain constant, straight-line contact with the chain pin at all times, an important feature if the chain is to function satisfactorily.

In Figures 4-8 inclusive, a modified form of the invention is disclosed, in which the structure and relationship of the side plates and bushings are the same as Figures 1-3 inclusive, but instead of selecting a pin which may bear against the flat sides 17 and 18 of the bushing bore, a pintle rocker 21 with flat side portions 22 of substantially the same length as bushing 12 is inserted within the bushing.

Figure 7:
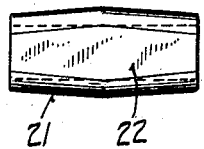
Figure 7 is a detail in side elevation of the pintle rocker used with the chain of Figure 4.
Figure 8:
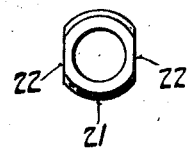
Figure 8 is an end view of the pintle rocker shown in Figure 7.

Pintle rocker 21 is apertured to accommodate with a bearing fit throughout its length, the pintle pin 14, as a consequence of which there is a sleeve bearing for the pin, in all positions of flexing and the tension of driving is distributed over the whole bearing area. Pintle rocker 21 is best illustrated in Figures 7 and 8.

The outside of rocker 21 is tapered with its largest diameter at the center, the taper being only a few degrees from the center to the end; the width of the flat side portions 22 of the rocker being less at the ends to accommodate the rocking. If desired, pilot pins 19 may be employed as in Figure 3 to act as a fulcrum for pin tilting, in which case the sleeves need not be tapered as shown.

The flat surfaces of the rocker 22 are arranged to have a sliding fit against the flats 17 and 18 on the inside of the bushing, said flat sections transmitting pressure due to tension from the pin to the bushing. Since the rocking motion is only slight and the surfaces of contact on the flat section are relatively large, excessive wear at this section of the joint is precluded.

In this manner, the pin is permitted to flex in a plane normal to the centerline of the chain, while at the same time 100% bearing contact is maintained in the rocker in which the pin is retained. This rocker, in turn, is restricting in its flexing movement to action in one plane only, and pressure is transmitted from the pin to the bushing with substantially equal effectiveness in all positions of the rocker.

Either arrangement described prevents twisting of the chain in its own plane and constant, straight-line bearing contact is maintained between the pin and its bushing regardless of the angle of tilt of the pin with respect to the succeeding link. Such contact is maintained whether the chain be running straight, in twisted condition, or during the transition from one state to the other.

Naturally there must be sufficient clearance between the inner and outer side plates to enable the links to twist with respect to each other as previously described. With the usual number of links in a truck or tractor transmission, considerable misalignment of sprocket axles may be accommodated with the present chain, the sprocket and chain action being smooth without undue or abnormal twisting strains, and the component parts being capable of resisting severe shocks.

It will be understood that the invention is not to be limited to any particular form of chain or any particular means here disclosed, the only limitations being those expressed in the following claims:

I claim:

1. In sprocket chain comprising links connected by pins which extend through bushings in adjacent links, a bushing having an internal bore, flat sided in planes transverse to the chain links, a rocker sleeve having flat outer sides contacting the flat inner sides of said bushing, said sleeve being free to rock in said bushing, and a chain pin in bearing contact within said sleeve.

2. In sprocket chain comprising links connected by pins which extend through bushings in adjacent links, a bushing having an internal bore, a sleeve disposed within said bushing for movement only in the plane transverse to the chain links, and a chain pin extending through said sleeve and having a running fit therein.

3. In a chain, a plurality of links, means for joining them including a bushing and a pin extending therethrough, a sleeve enclosing said pin and disposed within said bushing, said sleeve being spaced from said bushing a greater distance at the ends of the sleeve than at the center, along a line transverse to the chain links, to permit rocking of the sleeve in the bushing, said bushing and sleeve having flat sides in contact preventing any relative movement except in the plane transverse to the plane of the links.

4. In a sprocket chain arranged to afford limited twisting movement, the combination of a plurality of chain links and means for joining them, said means comprising a bushing with an internal bore which is flat sided in planes transverse to the chain, a rocker sleeve having flat outer sides arranged to provide extended surface contact with the flat inner sides of said bushing, whereby chain loads may be transmitted through surface contact between said members, the outer surface of said sleeve intermediate of the flats being tapered from the center to the ends to afford limited rocking movement, said sleeve having an internal contour which is cylindrical, and a chain pin extending through said sleeve in bearing contact therewith.

HERMANN KLAUCKE.